(12) United States Patent
Aoki et al.

(10) Patent No.: US 7,837,967 B2
(45) Date of Patent: Nov. 23, 2010

(54) THERMAL SPRAY POWDER AND METHOD FOR FORMING THERMAL SPRAY COATING

(75) Inventors: Isao Aoki, Tajimi (JP); Hiroyuki Ibe, Kakamigahara (JP); Junya Kitamura, Kakamigahara (JP)

(73) Assignee: Fujimi Incorporated, Kiyosu-shi, Aichi (JP)

( * ) Notice: Subject to any disclaimer, the term of this patent is extended or adjusted under 35 U.S.C. 154(b) by 284 days.

(21) Appl. No.: 11/932,144

(22) Filed: Oct. 31, 2007

(65) Prior Publication Data
US 2008/0112873 A1  May 15, 2008

(30) Foreign Application Priority Data
Oct. 31, 2006 (JP) .............................. 2006-296933

(51) Int. Cl.
*B32B 5/00* (2006.01)
(52) U.S. Cl. ........................ 423/263; 428/402; 428/403; 428/404; 428/405; 428/323; 428/357; 428/688; 427/446; 427/453; 501/126; 501/152
(58) Field of Classification Search ................. 423/263; 428/402–405, 323, 357, 688; 501/126, 152; 106/286.1; 427/446, 453
See application file for complete search history.

(56) References Cited

U.S. PATENT DOCUMENTS

| | | | |
|---|---|---|---|
| 6,576,354 B2 | 6/2003 | Tsukatani et al. | |
| 6,596,397 B2 | 7/2003 | Kaneyoshi et al. | |
| 6,685,991 B2 | 2/2004 | Wataya et al. | |
| 6,733,843 B2 | 5/2004 | Tsukatani et al. | |
| 6,767,636 B2 | 7/2004 | Takai et al. | |
| 6,852,433 B2 | 2/2005 | Maeda | |
| 6,916,534 B2 * | 7/2005 | Wataya et al. | 428/402 |

FOREIGN PATENT DOCUMENTS

JP  2002-080954  3/2002

OTHER PUBLICATIONS

The Rare Earth Oxides Group of Minerals, website: www.galleries.com/minerals/oxides/rare_ear.*

"Plasma-Erosion Properties of Ceramic Coating Prepared by Plasma Spraying", Materials Transactions, the Japan Institute of Metals, vol. 47, No.7, pp. 1677 to pp. 1683, 2006.

* cited by examiner

*Primary Examiner*—Steven Bos
(74) *Attorney, Agent, or Firm*—Vidas, Arrett & Steinkraus, P.A.

(57) ABSTRACT

A thermal spray powder contains particles composed of an oxide of any of the rare earth elements having an atomic number of 39 or from 59 to 70. The crushing strength of the particles is 80 MPa or greater. The ratio of bulk specific gravity to true specific gravity of the thermal spray powder is 0.15 or greater. The particles are preferably granulated and sintered particles. The average particle size of primary particles constituting the granulated and sintered particles is preferably 6 μm or less.

8 Claims, No Drawings

THERMAL SPRAY POWDER AND METHOD FOR FORMING THERMAL SPRAY COATING

BACKGROUND OF THE INVENTION

The present invention relates to a thermal spray powder and a method for forming a thermal spray coating.

In the field of fabricating semiconductor devices or liquid crystal devices, it is common to conduct microfabrication by plasma etching, which is one type of dry etching, using a reactive ion etching apparatus. Therefore, in semiconductor device fabrication apparatuses and liquid crystal device fabrication apparatuses, a member which is exposed during the etching process to the reactive plasma may suffer from erosion (damage). If particles are generated from a member in the semiconductor device fabrication apparatus or liquid crystal device fabrication apparatus by plasma erosion, the particles can deposit on the silicon wafer used in a semiconductor device or the glass substrate used in a liquid crystal device. If the amount of deposited particles is large or if the particles have a large size, the microfabrication cannot be carried out as designed, whereby the device yield decreases and quality defects occur, which can cause the device costs to increase.

In view of this, conventionally plasma erosion of members that are exposed to reactive plasma during an etching process has been suppressed or prevented by providing a ceramic thermal spray coating on the members (see, for example, Japanese Laid-Open Patent Publication No. 2002-80954). However, conventional thermal spray coatings do not sufficiently satisfy the required performance concerning plasma erosion resistance, and thus there still remains the need for improvements.

In the Examples of Japanese Laid-Open Patent Publication No. 2002-80954, the etching rate is 2 to 3 nm/min. The etching conditions obtainable with such an etching rate have a low plasma output (plasma power density) of at most about 200 W (0.6 W/cm$^2$) (see KITAMURA et al., "Plasma-Erosion Properties of Ceramic Coating Prepared by Plasma Spraying", Materials Transactions, The Japan Institute of Metals, Vol. 47, No. 7, pages 1677 to 1683, 2006). In contrast, in current etching processes for semiconductor device fabrication apparatuses and liquid crystal device fabrication apparatuses, to shorten the etching process time, the plasma output is generally set at 1,000 W or greater and the plasma power density set at 3 W/cm$^2$ or greater. The thermal spray coating of Japanese Laid-Open Patent Publication No. 2002-80954 does not sufficiently satisfy the required performance concerning plasma erosion resistance under such tough etching conditions.

SUMMARY OF THE INVENTION

Accordingly, it is an objective of the present invention to provide a thermal spray powder suitable for forming a thermal spray coating which has excellent plasma erosion resistance, and a method for forming a thermal spray coating.

In accordance with a first aspect of the present invention, a thermal spray powder is provided. The thermal spray powder contains particles composed of an oxide of any of the rare earth elements having an atomic number of 39 or from 59 to 70. The crushing strength of the particles is 80 MPa or greater. The ratio of bulk specific gravity to true specific gravity of the thermal spray powder is 0.15 or greater.

In accordance with a second aspect of the present invention, a method for forming a thermal spray coating by plasma thermal spraying the above thermal spray powder is provided.

Other aspects and advantages of the invention will become apparent from the following description, illustrating by way of example the principles of the invention.

DETAILED DESCRIPTION OF THE PREFERRED EMBODIMENTS

A first embodiment of the present invention will now be described.

Thermal spray powder according to the present embodiment is composed of particles composed of an oxide of any of the rare earth elements having an atomic number of 39 or from 59 to 70. "Rare earth elements having an atomic number of 39 or from 59 to 70" are, specifically, yttrium (Y, atomic number 39), praseodymium (Pr, atomic number 59), neodymium (Nd, atomic number 60), promethium (Pm, atomic number 61), samarium (Sm, atomic number 62), europium (Eu, atomic number 63), gadolinium (Gd, atomic number 64), terbium (Tb, atomic number 65), dysprosium (Dy, atomic number 66), holmium (Ho, atomic number 67), erbium (Er, atomic number 68), thulium (Tm, atomic number 69), and ytterbium (Yb, atomic number 70).

When the particles in the thermal spray powder are composed of an oxide of any of the rare earth elements having an atomic number 39 or from 59 to 68, specifically, Y, Pr, Nd, Pm, Sm, Eu, Gd, Tb, Dy, Ho or Er, a thermal spray coating can be formed from the thermal spray powder, which coating has better plasma erosion resistance than when the thermal spray powder is composed of an oxide of either the rare earth element having an atomic number 69 or 70, specifically Tm or Yb. More specifically, when the particles in the thermal spray powder are composed of an oxide of any of the rare earth elements having an atomic number 60 to 66, specifically, Nd, Pm, Sm, Eu, Gd, Tb or Dy, a thermal spray coating can be formed from the thermal spray powder, which coating has better plasma erosion resistance than when the thermal spray powder is composed of an oxide of any of the rare earth elements having an atomic number 39, 59, or 67 to 70, specifically Y, Pr, Ho, Er, Tm or Yb. Therefore, the particles in the thermal spray powder are preferably composed of an oxide of any of the rare earth elements having an atomic number 39 or from 59 to 68 from among the rare earth elements having an atomic number 39 or from 59 to 70, and more preferably are composed of an oxide of any of the rare earth elements having an atomic number from 60 to 66.

The crushing strength of the particles in the thermal spray powder according to the present embodiment must be 80 MPa or greater. The higher the crushing strength, the more strongly disintegration of the particles in the thermal spray powder is suppressed in a tube connecting a powder feeder with a thermal spray device while the thermal spray powder is being supplied from the powder feeder to the thermal spray device, or when the thermal spray powder supplied to the thermal spray device is charged into a heat source for thermal spraying such as a thermal spray flame. If the particles in the thermal spray powder disintegrate before thermal spraying, minute particles which are highly susceptible to overheating from the heat source during thermal spraying are formed, whereby a phenomenon known as "spitting" tends to occur during thermal spraying. The term "spitting" refers to the phenomenon wherein deposits of excessively molten thermal spray powder fall from the thermal spray nozzle inner wall of the thermal spray device and is spat out towards the thermal spray subject. If spitting occurs during thermal spraying, the quality of the obtained thermal spray coating, including plasma erosion resistance, may deteriorate. Further, since the minute particles formed by the disintegration of the particles in the thermal spray powder have a light weight, they tend to be spat out from the heat source, and hence may not be sufficiently heated by the heat source. If such minute particles which have not been melted or softened due to insufficient heating are mixed in the thermal spray coating, the inter-particle binding force in the thermal spray coating decreases, whereby the quality of the obtained thermal spray coating, including plasma erosion resistance, may deteriorate. In this regard, so long as the crushing strength of the particles in the thermal spray powder is 80 MPa or greater, disintegration of the particles in the thermal spray powder can be more strongly suppressed, thereby allowing a thermal spray coating having excellent plasma erosion resistance to be obtained. To further improve the plasma erosion resistance of the thermal spray coating, the crushing strength of the particles in the thermal spray powder is preferably 90 MPa or greater, and more preferably is 100 MPa or greater.

Although the upper limit of the crushing strength of the particles in the thermal spray powder is not particularly limited, it is preferably 250 MPa or less, more preferably 200 MPa or less, and most preferably 1.90 MPa or less.

The ratio of bulk specific gravity to true specific gravity of the thermal spray powder according to the present embodiment must be 0.15 or greater. As this ratio increases, the flowability of the thermal spray powder increases, so that the supply of the thermal spray powder is stabilized during thermal spraying. In addition, the number of pores in the thermal spray coating formed from the thermal spray powder greatly decreases, thereby reducing the porosity of the thermal spray coating. In this regard, so long as the ratio of bulk specific gravity to true specific gravity of the thermal spray powder is 0.15 or greater, pulsation of the thermal spray powder during thermal spraying can be strongly suppressed and the number of pores in the thermal spray coating formed from the thermal spray powder also can be greatly decreased, thereby allowing a thermal spray coating having excellent plasma erosion resistance to be obtained. To further improve the plasma erosion resistance of the thermal spray coating, the ratio of bulk specific gravity to true specific gravity of the thermal spray powder is preferably 0.17 or greater, more preferably 0.20 or greater and most preferably 0.25 or greater.

Although the upper limit of the ratio of bulk specific gravity to true specific gravity of the thermal spray powder is not particularly limited, it is preferably 0.45 or less, and more preferably 0.40 or less.

The average particle size of the thermal spray powder according to the present embodiment is preferably 5 μm or greater, more preferably 8 μm or greater, and most preferably 10 μm or greater. As the average particle size of the thermal spray powder increases, the flowability of the thermal spray powder increases, so that the supply of the thermal spray powder is stabilized during thermal spraying. More specifically, the occurrence of pulsation, in which the supplied amount of thermal spray powder periodically increases and decreases, is more strongly suppressed. When the supplied amount of thermal spray powder increases due to pulsation, particles which have not been melted or softened due to insufficient heating by the heat source can become mixed in the thermal spray coating, or spitting can occur. Therefore, if pulsation of the thermal spray powder occurs during thermal spraying, not only does the plasma erosion resistance decrease, but the obtained thermal spray coating may also become uneven. In this regard, so long as the average particle size of the thermal spray powder is 5 μm or greater, or more specifically 8 μm or greater, or even more specifically 10 μm or greater, pulsation of the thermal spray powder during thermal spraying is strongly suppressed, thereby allowing the plasma erosion resistance of the thermal spray coating to be improved even more.

The average particle size of the thermal spray powder is preferably 40 μm or less, more preferably 37 μm or less, and most preferably 35 μm or less. As the average particle size of the thermal spray powder decreases, the number of pores in the thermal spray coating formed from the thermal spray powder greatly decreases, thereby reducing the porosity of the thermal spray coating. A thermal spray coating having low porosity has high plasma erosion resistance. In this regard, so long as the average particle size of the thermal spray powder is 40 μm or less, or more specifically 37 μm or less, or even more specifically 35 μm or less, the number of pores in the thermal spray coating formed from the thermal spray powder can be greatly decreased, thereby allowing the plasma erosion resistance of the thermal spray coating to be improved even more.

The particles in the thermal spray powder according to the present embodiment may be granulated and sintered particles or melted and crushed particles of a rare earth oxide, or may be rare earth oxide particles produced from a rare earth hydroxide by a deposition method or a sol-gel method. However, granulated and sintered particles are preferred. Compared with melted and crushed particles, granulated and sintered particles have the advantages of good flowability due to their high sphericity and low contamination of impurities during production. Granulated and sintered particles are produced by granulating and sintering a raw material powder. The resultant product is broken into smaller particles and, if necessary, is classified. Melted and crushed particles are produced by cooling a raw material melt to solidify, then crushing and, if necessary, classifying the resultant product.

The production of the granulated and sintered particles will be described in detail below.

In a granulating and sintering method, first a granulated powder is produced from a raw material powder, then this granulated powder is sintered. The resultant product is broken into smaller particles and, if necessary, is classified to produce the granulated and sintered particles. The raw material powder may be a powder of an oxide of any of the rare earth elements having an atomic number of 39 or from 59 to 70, or may be a powder of a simple substance of any of the same rare earth elements, or may be a powder of a hydroxide of any of the same rare earth elements. The raw material powder may also be a mixture of two or three of these powders. If a simple substance or a hydroxide of any of the rare earth elements is contained in the raw material powder, such a substance is ultimately converted into a rare earth oxide during the granulating and sintering processes. During the granulating and sintering processes, the particles in the raw material powder bind to each other, thereby increasing the particle size. For this reason, the average particle size of the raw material powder is preferably 0.9 times or less the average particle size of the primary particles constituting the granulated and sintered particles. Specifically, the average particle size of the raw material powder is preferably 5.4 μm or less, more preferably 2.7 μm or less, even more preferably 1.8 μm or less, and most preferably 1.1 μm or less.

Production of the granulated powder from a raw material powder may be carried out by mixing the raw material powder in a suitable dispersion medium, optionally adding a binder, then spray-granulating the resultant slurry, or by tumbling-granulating or compression-granulating to directly produce the granulated powder from the raw material powder. Sintering of the granulated powder may be carried out in any of air, a vacuum, and an inert gas atmosphere. However, it is preferable to carry out in air when a simple substance or a hydroxide of any of the rare earth elements is contained in the raw material, because such a substance will be converted to a rare earth oxide. An electric furnace or a gas furnace may be used for the sintering of the granulated powder. To obtain sintered particles having a high crushing strength, the sintering temperature is preferably 1,200 to 1,700° C., more preferably 1,300 to 1,700° C., even more preferably 1,400 to 1,700° C., and most preferably 1,500 to 1,700° C. To obtain sintered particles having a high crushing strength, the holding time at the maximum temperature is preferably 30 minutes to 10 hours, and more preferably 1 to 5 hours.

If the particles in the thermal spray powder are granulated and sintered particles, the average particle size of the primary particles constituting the granulated and sintered particles is preferably 6 µm or less, more preferably 3 µm or less, still more preferably 2 µm or less, and most preferably 1.2 µm or less. A thermal spray coating formed from a thermal spray powder normally exhibits a lamellar structure. As the average particle size of the primary particles constituting the granulated and sintered particles decreases, the width dimension of the inter-lamellar region in the thermal spray coating becomes smaller. This inter-lamellar region contains a large quantity of crystal defects. Since plasma erosion of the thermal spray coating preferentially proceeds from defective portions in the thermal spray coating, a thermal spray coating which contains an inter-lamellar region with a small width dimension tends to have better plasma erosion resistance. In this regard, so long as the average particle size of the primary particles constituting the granulated and sintered particles is 2 µm or less, or more specifically 1.5 µm or less, or even more specifically 1.2 µm or less, or even further specifically 1.0 µm or less, the plasma erosion resistance of the thermal spray coating can be improved even more. Further, if the average particle size of the primary particles constituting the granulated and sintered particles is 2 µm or less, each primary particle is thoroughly melted by the heat source, so that the plasma erosion resistance of the thermal spray coating improves still further also as a result of the strengthened bonds between the particles, that is, the inter-lamellar bonds.

The angle of repose of the thermal spray powder according to the present embodiment is preferably 50° or less, more preferably 48° or less, and most preferably 47° or less. As the angle of repose decreases, the flowability of the thermal spray powder improves, so that the uniformity of the obtained thermal spray coating improves. Thus, by setting the angle of repose to 50° or less, or more specifically to 48° or less, or even more specifically to 47° or less, the plasma erosion resistance of the thermal spray coating can be improved even further.

The rare earth oxide constituting the particles in the thermal spray powder according to the present embodiment preferably has a standard Gibbs energy of formation at 100° C. of −1,685 kJ/mol or less. The "standard Gibbs energy of formation" refers to the standard free energy when a compound of an element is formed from the element in its standard state. A compound having a negative value can be said to be more thermodynamically stable than its constituent element. This specifically means that the greater the absolute value of the negative value of the standard Gibbs energy of formation, the more thermodynamically stable the compound is. Such a compound has a high plasma erosion resistance. In this regard, so long as the standard Gibbs energy of formation at 100° C. of the rare earth oxide constituting the particles in the thermal spray powder is −1,685 kJ/mol or less, the plasma erosion resistance of the thermal spray coating obtained from the thermal spray powder can be improved even more.

The rare earth element in the rare earth oxide constituting the particles in the thermal spray powder according to the present embodiment preferably has a six-coordinated, trivalent ion radius of 0.865 nm or greater, more preferably 0.895 nm or greater, and most preferably 0.910 nm or greater. Generally, since the number of electrons increases with atomic number, the size of the ion increases in order to hold the electrons, and thus the radius of the ion increases. However, in the case of lanthanide ions, whose atomic number is from 57 (La) to 71 (Lu), this trend reverses, so that ion radius decreases as atomic number increases. This phenomenon is referred to as "lanthanide contraction". This is due to the increase in atomic number, i.e., the increase in (+) nuclear charge, not being sufficiently blocked by the similarly increased number of electrons in the $4f$ orbital, whereby the outer electron cloud is gradually pulled towards the nucleus. Further, the $4f$ orbital is present inside of the $5s$, $5p$ and $5d$ orbitals, and the effect of the outer fields is small. Thus, the $4f$ orbital can be said to be an isolated electron system. Namely, the fact that ion radius decreases means that the electrons in the outer $5s$, $5p$ and $5d$ orbitals are pulled towards the nucleus of the lanthanide atom. Therefore, in the case of forming an oxide ceramic by binding to an oxygen atom, when pulled towards the nucleus, or in other words, when the ion radius is decreased, it is more difficult for the outer electrons of the lanthanide to contribute to binding to the oxygen atom. As a result, the plasma erosion resistance of the oxide ceramic decreases. In this regard, so long as the six-coordinated, trivalent ion radius of the rare earth element in the rare earth oxide constituting the particles in the thermal spray powder is 0.865 nm or greater, or more specifically 0.895 nm or greater, or even more specifically 0.910 nm or greater, the plasma erosion resistance of the thermal spray coating obtained from the thermal spray powder can be improved even more.

The true specific gravity of the thermal spray powder according to the present embodiment is preferably 5 or greater, and more preferably 7 or greater. As true specific gravity increases, the ion bombardment resistance of the thermal spray coating improves, which allows the plasma erosion resistance of the thermal spray coating to improve. In this regard, so long as the true specific gravity is 5 or greater, or more specifically 7 or greater, the plasma erosion resistance of the thermal spray coating obtained from the thermal spray powder can be improved even more.

The thermal spray powder according to the present embodiment is used in applications for forming a thermal spray coating by plasma thermal spraying or other thermal spraying methods. With plasma thermal spraying, a thermal spray coating having a higher plasma erosion resistance can be formed from a thermal spray powder than for other thermal spraying methods. Therefore, the thermal spraying of the thermal spray powder according to the present embodiment is preferably conducted by plasma thermal spraying.

The following advantages are obtained by the present embodiment.

In the thermal spray powder according to the present embodiment, the particles in the thermal spray powder are composed of an oxide of any of the rare earth elements having an atomic number of 39 or from 59 to 70, the crushing strength of the particles in the thermal spray powder is 80 MPa or greater, and the ratio of bulk specific gravity to true specific gravity of the thermal spray powder is 0.15 or greater. As a result, a thermal spray coating formed from the thermal spray powder of the present embodiment has excellent plasma erosion resistance. Put another way, the thermal spray powder of the present embodiment is suitable for the formation of a thermal spray coating which has excellent plasma erosion resistance.

The above-described embodiment may be modified as follows.

The thermal spray powder may contain two or more different particles composed of an oxide of any of the rare earth elements having an atomic number of 39 or from 59 to 70.

The thermal spray powder may contain a component other than the particles composed of an oxide of any of the rare earth elements having an atomic number of 39 or from 59 to 70. However, the content of the component other than the particles composed of an oxide of any of the rare earth elements having an atomic number of 39 or from 59 to 70 is preferably as small as possible. Specifically, such content is preferably less than 10%, more preferably less than 5%, and most preferably less than 1%.

The particles in the thermal spray powder may contain a component other than the oxide of any of the rare earth elements having the atomic number of 39 or from 59 to 70. However, the content of the component other than the oxide of any of the rare earth elements having an atomic number of 39 or from 59 to 70 is preferably as small as possible. Specifically, such content is preferably less than 10%, more preferably less than 5%, and most preferably less than 1%.

Next, the present invention will be described in more detail with reference to examples and comparative examples.

Thermal spray powders for Examples 1 to 9 and Comparative Examples 1 to 6 composed of granulated particles, granulated and sintered particles, or melted and crushed particles of a rare earth oxide were prepared. The details of each thermal spray powder are listed in Table 1.

The column entitled "Rare Earth Oxide Type" in Table 1 shows the composition formula of the rare earth oxides contained in each thermal spray powder.

The column entitled "Crushing Strength" in Table 1 shows the measured crushing strength of the particles in each thermal spray powder. Specifically, this column shows the crushing strength σ [MPa] of the particles in each thermal spray powder calculated according to the formula: $\sigma=2.8 \times L/\pi/d^2$. In the formula, "L" represents the critical load [N], and "d" represents the average particle size (mm) of the thermal spray powder. The critical load is the magnitude of the compressive load at the point where the displacement amount of an indenter applying on particles a compressive load increasing at a constant rate suddenly increases. The micro-compression testing machine "MCTE-500" manufactured by Shimadzu Corporation was used for the measurement of the critical load.

The columns entitled "Bulk Specific Gravity" and "True Specific Gravity" in Table 1 show the bulk specific gravity and true specific gravity for each thermal spray powder measured in accordance with the Japanese Industrial Standard JIS Z2504, respectively.

The column entitled "Bulk Specific Gravity/True Specific Gravity" in Table 1 shows the ratio of bulk specific gravity to true specific gravity calculated using the bulk specific gravity and true specific gravity measured for each thermal spray powder.

The column entitled "Average Particle Size" in Table 1 shows the average particle size of each thermal spray powder measured using the laser diffraction/scattering particle size measuring apparatus "LA-300" manufactured by Horiba, Ltd. The thermal spray powder average particle size represents the particle size of the last cumulative particle when the cumulative volume of the particles in the thermal spray powder in order from the smallest particle size reaches 50% or more of the cumulative volume of all the particles in the thermal spray powder.

The column entitled "Particle Type" in Table 1 shows the type of particles in each thermal spray powder. In this column, "granulated" denotes granulated particles, "granulated and sintered" represents granulated and sintered particles and "melted and crushed" represents melted and crushed particles.

The column entitled "Average Primary Particle Size" in Table 1 shows the result of the average particle size of the primary particles constituting the granulated particles or granulated and sintered particles in each thermal spray powder measured using a field-emission scanning electron microscope (FE-SEM). Specifically, this represents the mean of fixed diameters (Feret's diameter) measured by randomly selecting 10 particles from each thermal spray powder, then randomly selecting 50 primary particles from each of the 10 selected particles, and measuring the total of 500 primary particles for each thermal spray powder. The "fixed diameter" is the distance between two imaginary lines that sandwich a particle and extend in parallel.

The column entitled "Angle of Repose" in Table 1 shows the angle of repose of each thermal spray powder measured using the A.B.D-powder characteristic measuring instrument "A.B.D-72 model" manufactured by Tsutsui Rikagaku Kikai Co Ltd.

The column entitled "ΔG" in Table 1 shows the standard Gibbs energy of formation at 100° C. of the rare earth element constituting each thermal spray powder.

The column entitled "Ion Radius" in Table 1 shows the six-coordinated, trivalent ion radius of the rare earth element in the rare earth oxide constituting each thermal spray powder.

Thermal spray coatings having a thickness of 200 μm were formed by thermal spraying the thermal spray powders of Examples 1 to 9 and Comparative Examples 1 to 6 under the thermal spray conditions shown in Table 2. The obtained thermal spray coatings were evaluated for their durability against erosion from plasma etching. Specifically, first, the surface of each of the thermal spray coatings was mirror-polished using colloidal silica having an average particle size of 0.06 μm. Part of the surface of the polished thermal spray coatings was masked with polyimide tape, and the whole surface of the thermal spray coatings was then plasma etched under the conditions shown in Table 3. After that, the height of a step between the masked portion and the unmasked portion was measured using the step measuring device "Alpha-Step" manufactured by KLA-Tencor Corporation to calculate the etching rate by dividing the measured step height by the etching time. Thermal spray coating plasma erosion resistance evaluated from the etching rate when plasma etching was carried out under the conditions of Table 3 is shown in the column entitled "Plasma Erosion Resistance" in Table 1. In this column, the letter "E" (Excellent) indicates that the ratio of thermal spray coating etching rate to the thermal spray coating etching rate of Comparative Example 2 was less than 0.75, the letter "G" (Good) indicates that this ratio was 0.75 or greater to less than 0.80, the letter "F" (Fair) indicates that this ratio was 0.80 or greater to less than 0.90, and the letter "P" (Poor) indicates that this ratio was 0.90 or greater.

TABLE 1

| | Rare Earth Oxide Type | Crushing Strength (MPa) | Bulk Specific Gravity | True Specific Gravity | Bulk Specific Gravity/True Specific Gravity | Average Particle Size (μm) | Particle Type | Average Primary Particle Size (mm) | Angle of Repose (degrees) | ΔG (kJ/mol) | Ion Radius (nm) | Plasma Erosion Resistance |
|---|---|---|---|---|---|---|---|---|---|---|---|---|
| C. Ex. 1 | $Y_2O_3$ | 8 | 0.93 | 5.01 | 0.19 | 34.5 | granulated | 2.7 | 34 | −1790.660 | 0.900 | P |
| C. Ex. 2 | $Y_2O_3$ | 65 | 1.27 | 5.01 | 0.25 | 26.5 | granulated and sintered | 0.4 | 38 | −1790.660 | 0.900 | P |
| Ex. 1 | $Y_2O_3$ | 115 | 1.86 | 5.01 | 0.37 | 24.7 | granulated and sintered | 0.4 | 35 | −1790.660 | 0.900 | F |
| Ex. 2 | $Y_2O_3$ | 165 | 1.92 | 5.01 | 0.38 | 27.3 | granulated and sintered | 0.4 | 36 | −1790.660 | 0.900 | G |
| C. Ex. 3 | $Y_2O_3$ | 11 | 0.68 | 5.01 | 0.14 | 37.6 | granulated and sintered | 5.7 | 47 | −1790.660 | 0.900 | P |
| Ex. 3 | $Y_2O_3$ | 165 | 1.69 | 5.01 | 0.34 | 24.5 | melted and crushed | — | 38 | −1790.660 | 0.900 | G |
| C. Ex. 4 | $La_2O_3$ | 115 | 2.13 | 6.51 | 0.33 | 28.3 | granulated and sintered | 0.8 | 42 | −1681.424 | 1.032 | P |
| C. Ex. 5 | $CeO_2$ | 145 | 2.00 | 7.65 | 0.26 | 28.4 | granulated and sintered | 1.1 | 38 | −1682.830 | 1.010 | P |
| Ex. 4 | $Nd_2O_3$ | 150 | 2.34 | 7.24 | 0.32 | 30.6 | granulated and sintered | 0.8 | 36 | −1696.653 | 0.983 | G |
| Ex. 5 | $Sm_2O_3$ | 120 | 2.31 | 7.60 | 0.30 | 25.5 | granulated and sintered | 0.6 | 35 | −1713.676 | 0.958 | E |
| Ex. 6 | $Gd_2O_3$ | 160 | 2.55 | 7.41 | 0.34 | 24.0 | granulated and sintered | 0.9 | 38 | −1714.658 | 0.938 | E |
| C. Ex. 6 | $Gd_2O_3$ | 70 | 1.60 | 7.41 | 0.22 | 44.0 | granulated and sintered | 0.9 | 40 | −1714.658 | 0.938 | P |
| Ex. 7 | $Dy_2O_3$ | 150 | 2.28 | 7.81 | 0.29 | 23.8 | granulated and sintered | 0.8 | 37 | −1740.258 | 0.912 | E |
| Ex. 8 | $Er_2O_3$ | 120 | 2.34 | 8.64 | 0.27 | 24.5 | granulated and sintered | 0.8 | 33 | −1782.498 | 0.890 | G |
| Ex. 9 | $Yb_2O_3$ | 110 | 3.12 | 9.17 | 0.34 | 22.6 | granulated and sintered | 0.7 | 38 | −1704.166 | 0.868 | F |

TABLE 2

Conditions for Plasma Thermal Spraying at Atmospheric Pressure

| | |
|---|---|
| Substrate: | Al alloy sheet (A6061) (15 mm × 15 mm × 2 mm) subjected to blasting treatment by a brown alumina abrasive (A#40) |
| Thermal Spray device: | "SG-100" manufactured by Praxair Technology Inc. |
| Powder feeder: | "Model 1264" manufactured by Praxair Technology Inc. |
| Ar Gas Pressure: | 50 psi (0.34 MPa) |
| He Gas Pressure: | 50 psi (0.34 MPa) |
| Voltage: | 37.0 V |
| Current: | 900 A |
| Thermal Spray Distance: | 120 mm |
| Thermal Spray Powder Feeding Rate: | 20 g per minute |

TABLE 3

| | |
|---|---|
| Etching Apparatus: | Reactive ion etching apparatus "NLD-800" manufactured by ULVAC Inc. |
| Etching Gases: | $CF_4$, $O_2$ |
| Etching Gas Flow Rate: | $CF_4$ 0.054 L/min, $O_2$ 0.005 L/min |
| Chamber Pressure: | 1 Pa |
| Plasma Power: | 400 W |
| Plasma Exposure Region: | Diameter 100 mm |
| Plasma Power Per Thermal Spray Coating Unit Area: | 5.1 W/cm$^2$ |
| Etching Time: | 1 hour |

As shown in Table 1, the thermal spray coatings of Examples 1 to 9 had higher plasma erosion resistance than that for the thermal spray coatings of Comparative Example 1 to 6.

The invention claimed is:

1. A thermal spray powder comprising particles composed of an oxide of any of the rare earth elements having an atomic number of 39 or from 59 to 70,
    wherein the crushing strength of the particles is 80 MPa or greater,
    wherein the true specific gravity of the thermal spray powder is 5 or greater, and
    wherein the ratio of bulk specific gravity to true specific gravity of the thermal spray powder is 0.25 to 0.45.

2. The thermal spray powder according to claim 1, wherein the particles are composed of an oxide of any of the rare earth elements having an atomic number from 60 to 66.

3. The thermal spray powder according to claim 1, wherein the crushing strength of the particles is 100 to 250 MPa.

4. The thermal spray powder according to claim 1, wherein the particles are granulated and sintered particles, and the average particle size of primary particles constituting the granulated and sintered particles is 6 μm or less.

5. The thermal spray powder according to claim 1, wherein the angle of repose of the thermal spray powder is 50° or less.

6. The thermal spray powder according to claim 1, wherein the rare earth element included in the rare earth oxide constituting the particles has a six-coordinated, trivalent ion radius of 0.865 nm or greater.

7. The thermal spray powder according to claim 1, wherein the rare earth oxide constituting the particles has a standard Gibbs energy of formation at 100° C. of −1,685 kJ/mol or less.

8. The thermal spray powder according to claim 1, wherein the average particle size of the thermal spray powder is 5 to 40 μm.

* * * * *